G. W. HECTOR.
HANDSAW.
APPLICATION FILED JULY 14, 1913.

1,102,918.

Patented July 7, 1914.

Witnesses
Stuart Hilder.
Frances W. Anderson

Inventor
G. W. Hector
By E. W. Anderson & Son
his Attorney

UNITED STATES PATENT OFFICE.

GOAH W. HECTOR, OF CHARLESTON, MISSOURI.

HANDSAW.

1,102,918.   Specification of Letters Patent.   Patented July 7, 1914.

Application filed July 14, 1913. Serial No. 779,025.

*To all whom it may concern:*

Be it known that I, GOAH W. HECTOR, a citizen of the United States, resident of Charleston, in the county of Mississippi and State of Missouri, have made a certain new and useful Invention in Handsaws; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
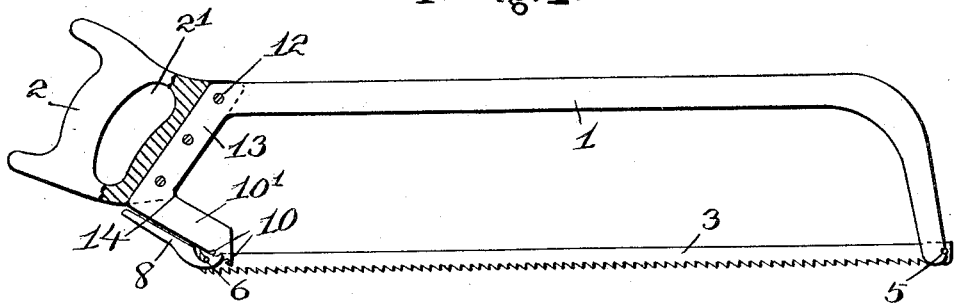
Figure 2:
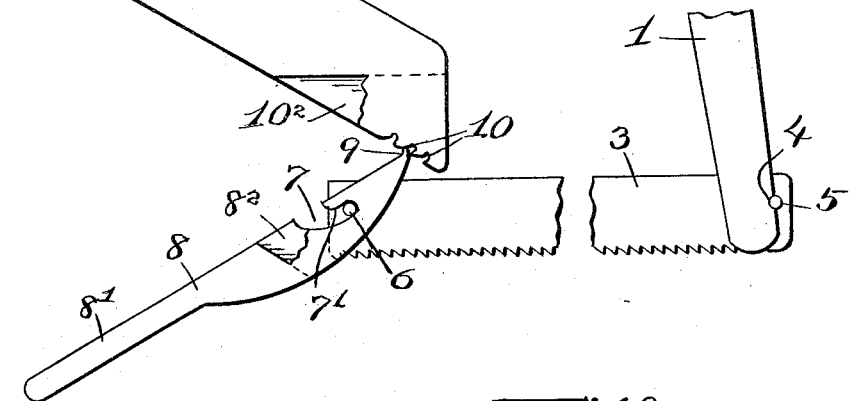
Figure 3:
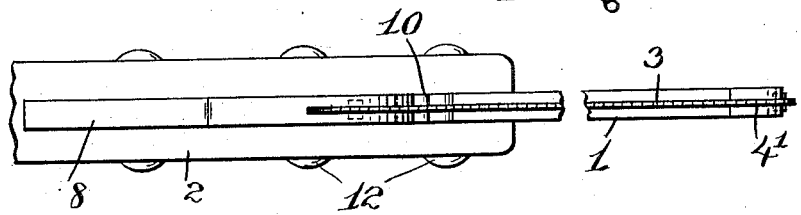

Figure 1 is a side view of the invention with parts in section. Fig. 2 is a detail view on a larger scale partly broken away, with the lever in first position before the saw blade is stretched the parts shown being the lever, the saw blade and parts adjacent thereto. Fig. 3 is a bottom plan view of the same.

The invention has relation to hand saws and particularly to saws having a bow frame such as hack and meat saws, having for its object mainly the provision of improved means for connecting and stretching the saw blade to and across the bow frame.

The invention consists in the novel construction and combinations of parts as hereinafter set forth.

In the accompanying drawings illustrating the invention, the numeral 1, designates the bow frame, 2, the slotted handle, and 3, the ribbon blade.

The outer end of the bow frame has preferably an open end seat 4, for the rivet 5 of the saw blade at this end, the other end of said blade having a rivet or stud 6, having preferably detachable engagement with an open end slot seat 7 of the lever 8. This lever has at its end 9 fulcrum engagement with any one of a series of notches or teeth 10 of the handle end of the bow frame, said handle end usually extending obliquely downward and away from the handle toward the outer end of the bow frame and terminating about even with the upper end of the slotted handle 2, which is usually connected to the bow frame by rivets 12 engaging an oblique arm 13 of the bow frame having an angular relation to the arm 10' of said frame wherein the teeth 10 are provided of about ninety degrees.

The rivet 5 of the saw blade being engaged within its seat 4 and the other rivet or stud 6 being engaged within the seat 7 of the lever, the lever is engaged at its fulcrum end with the proper tooth or notch 10, and closed upward to the arm 10' of the bow frame, whereby the stud 6 of the saw is caused to move away from the other stud 5 of the saw blade and the blade stretched or put under tension. The handle end 8' of the lever in this movement as soon as it passes the alined position with stud and saw blade will be caused to snap home or close securely home against the arm 10' of the saw frame, the tension of the blade causing the stud 6, located above the fulcrum end of the lever, to press against the upper wall 7' of the slot 7 to close the lever home.

The arm 10 of the saw frame and the lever 8 will be slotted at $10^2$ and $8^2$, centrally and longitudinally for engagement with the saw blade to prevent lateral movement of said blade, and the outer end of the bow frame will be similarly slotted at 4'.

In operation the engagement or connection of the blade with the handle is fortified by the downward and forward pressure of the handle, through its oblique arm 10', the direction of which is substantially at right angles to the hand slot 2'.

The handle end of the bow frame is of angular form the apex of the inner angle at 14 being at the upper end of the arm 10'. In this manner it is designed to remove the handle somewhat upward and rearward to facilitate control of the work and to provide improved leverage.

I claim:

In a saw, a bow frame having a handle end inclined downwardly toward the opposite frame end at a low angle of about thirty degrees to the horizontal and provided in its lower edge with a series of notches extending in line, a ribbon saw blade having pivotal connection with the opposite end of said frame, and a straight handle lever having a locking position parallel with and against the lower edge of said handle end, said lever having at one end fulcrum engagement with any one of said notches and intermediately of its length a pivotal connection with said blade.

In testimony whereof I affix my signature, in presence of two witnesses.

GOAH W. HECTOR.

Witnesses:
C. H. STANFILL,
T. M. REDWINE.

Copies of this patent may be obtained for five cents each, by addressing the "Commissioner of Patents, Washington, D. C."